(12) United States Patent  
Urbank et al.

(10) Patent No.: US 6,588,222 B1  
(45) Date of Patent: Jul. 8, 2003

(54) LOW-COST ENERGY-EFFICIENT VEHICLE AIR CONDITIONING SYSTEM

(75) Inventors: Thomas Martin Urbank, Lockport, NY (US); Karma Vir Sangwan, East Amherst, NY (US); Charles Andrew Archibald, Lockport, NY (US); James Joseph Christen, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/267,968

(22) Filed: Oct. 9, 2002

Related U.S. Application Data

(60) Provisional application No. 60/378,849, filed on May 8, 2002.

(51) Int. Cl.[7] .................................................. F25B 49/00
(52) U.S. Cl. ........................................ 62/127; 62/228.3
(58) Field of Search .............................. 62/239, 228.3, 62/230, 229, 127

(56) References Cited

U.S. PATENT DOCUMENTS

| | | | | |
|---|---|---|---|---|
| 4,476,919 A | * | 10/1984 | Akimoto et al. ............ 165/202 |
| 4,496,286 A | * | 1/1985 | Gagnon ....................... 417/22 |
| 4,946,350 A | * | 8/1990 | Suzuki et al. ............ 417/222.2 |
| 5,595,064 A | * | 1/1997 | Ikeda et al. .................... 62/126 |
| 5,884,497 A | * | 3/1999 | Kishita et al. ................. 62/193 |
| 5,924,296 A | * | 7/1999 | Takano et al. ................. 62/133 |
| 6,176,095 B1 | * | 1/2001 | Porter ........................ 62/126 |
| 6,367,272 B1 | * | 4/2002 | Zeng et al. ................ 62/228.5 |
| 6,430,951 B1 | * | 8/2002 | Iritani et al. ................... 62/229 |
| 6,484,520 B2 | * | 11/2002 | Kawaguchi et al. .......... 62/133 |
| 6,487,869 B1 | * | 12/2002 | Sulc et al. ..................... 62/230 |

FOREIGN PATENT DOCUMENTS

JP  402154879 A  *  6/1990  ............ 251/129.15

* cited by examiner

*Primary Examiner*—William E. Tapolcai  
*Assistant Examiner*—Mohammad M. Ali  
(74) *Attorney, Agent, or Firm*—Patrick M. Griffin

(57) ABSTRACT

An energy-efficient vehicle air conditioning system includes a variable capacity refrigerant compressor having a capacity control valve with integral refrigerant sensors and control circuitry, and a driver interface panel for selecting the discharge air temperature and inlet air source, and for selecting either a normal control mode or an energy-efficient control mode. When the energy-efficient control mode is selected, control setting indicators prompt the driver to request full-cold discharge air temperature and recirculated cabin air, and the control circuitry initiates a compressor capacity control based on the refrigerant sensor information and a measure of the outside air temperature to produce a suitable discharge air temperature at a reduced power consumption level.

11 Claims, 5 Drawing Sheets

LOW-COST ENERGY-EFFICIENT VEHICLE AIR CONDITIONING SYSTEM

PRIOR APPLICATION

This application claims the benefit of prior Provisional Patent Application Ser. No. 60/378,849 filed May 8, 2002.

FIELD OF THE INVENTION

This invention relates to a low-cost energy-efficient vehicle air conditioning system including an electrically operated variable capacity refrigerant compressor and a manual driver interface.

BACKGROUND OF THE INVENTION

Variable capacity refrigerant compressors have been utilized in both manual and automatic vehicle air conditioning systems, primarily to reduce engine load disturbances associated with compressor clutch cycling. In a typical implementation, the compressor includes one or more pistons coupled to a tiltable wobble plate or swash plate, and a pneumatic or electromagnetic control valve for adjusting the pressure in a crankcase of the compressor to control the compressor capacity. The system control strategy usually involves adjusting the compressor capacity to maintain a predetermined low-side refrigerant condition (refrigerant suction pressure or evaporator outlet air temperature, for example) that provides maximum cooling without evaporator icing, and using a high-side pressure switch to disengage the compressor clutch if the refrigerant discharge pressure becomes too high. The inlet air may consist of outside air or recirculated cabin air, and the temperature of the discharge air is typically controlled by adjusting a mechanism (such as an air mix door) that reheats a portion of the conditioned air.

While the above-described control strategy is simple and reasonably effective, it has been recognized that the energy efficiency of the system could be significantly improved by increasing the usage of recirculated cabin air and reducing the compressor capacity in a way that provides adequate dehumidification while minimizing reheating of the conditioned air. However, since energy-efficient controls typically require a number of external sensors for measuring system and ambient parameters, development efforts have primarily been focused on automatic systems that usually include such sensors anyway. Accordingly, what is needed is a low-cost energy-efficient air conditioning control system suitable for usage in a so-called manual system where the operator manually controls the discharge air temperature and inlet air source.

SUMMARY OF THE PRESENT INVENTION

The present invention is directed to an improved energy-efficient vehicle air conditioning system including a variable capacity refrigerant compressor having a capacity control valve with integral refrigerant sensors and control circuitry. The system includes a driver interface panel for selecting the discharge air temperature and inlet air source, and for selecting either a normal control mode or an energy-efficient control mode. When the energy-efficient control mode is selected, control setting indicators prompt the driver to request full-cold discharge air temperature and recirculated cabin air, and the control circuitry initiates a compressor capacity control based on the refrigerant sensor information and a measure of the outside air temperature to produce a suitable discharge air temperature at a reduced power consumption level.

In a preferred embodiment, the capacity control valve includes suction and discharge pressure sensors, and the control circuitry selects a suction pressure target based on the outside air temperature and the sensed discharge pressure, and then adjusts the compressor capacity as required to attain the target suction pressure. Alternatively, the outside air temperature and sensed discharge pressure may be used to select a target evaporator outlet air temperature, which is compared with a measure of the actual evaporator outlet air temperature to produce a target suction pressure.

BRIEF DESCRIPTION OF THE DRAWING

The present invention will now be described, by way of example, with reference to the accompanying drawings in which:

FIG. 3A depicts the flexible circuit in a planar orientation, whereas FIG. 3B is an exploded view showing flexible circuit at the time of installation in the capacity control valve.

DESCRIPTION OF THE PREFERRED EMBODIMENT

Figure 1:
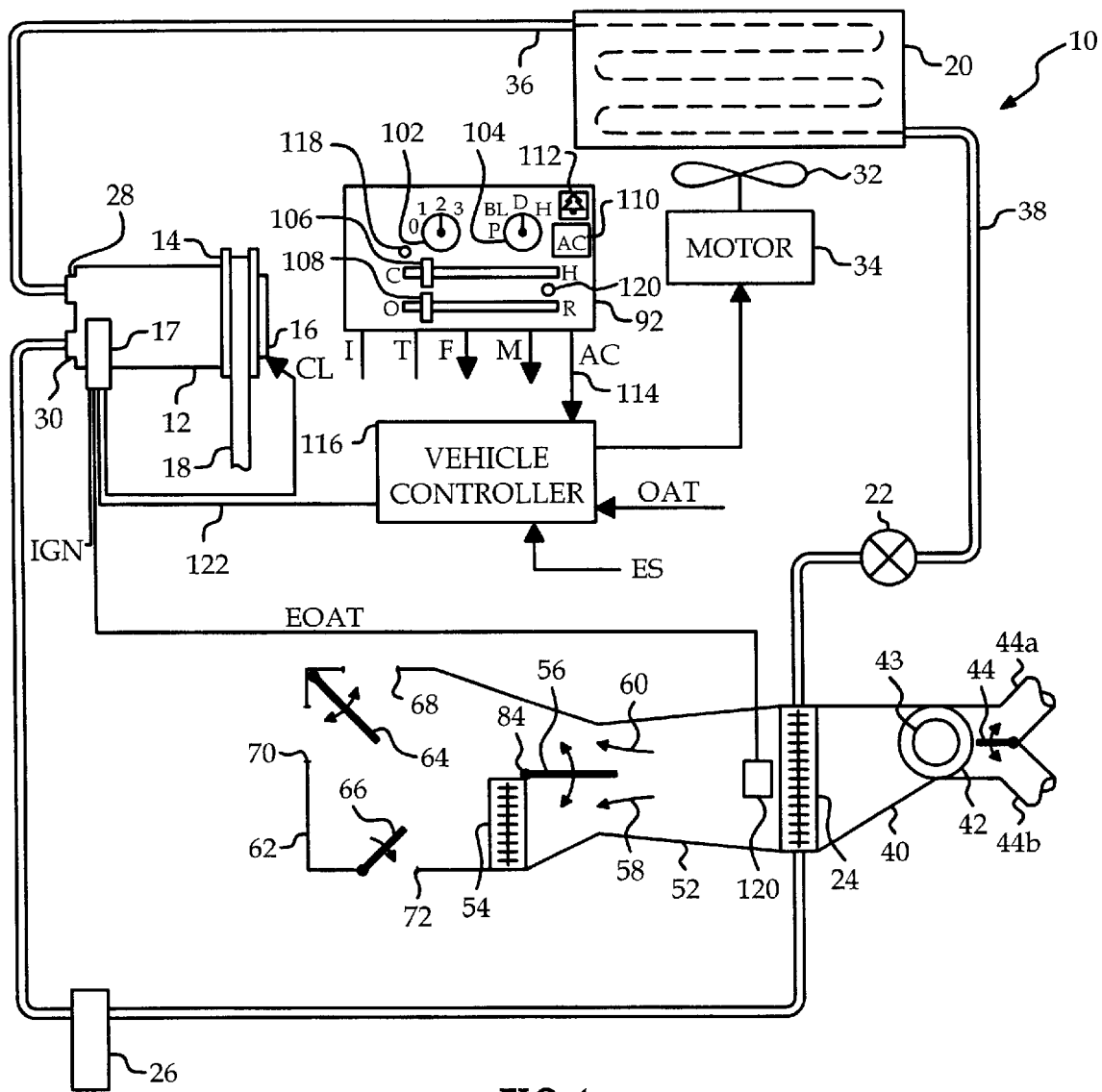
FIG. 1 is a diagram of a vehicle air conditioning system according to this invention, including a variable capacity refrigerant compressor, a capacity control valve with integral control circuitry and refrigerant pressure sensors, and a manual driver interface panel.

Referring to FIG. 1, the reference numeral 10 generally designates a vehicle air conditioning system, including a variable capacity refrigerant compressor 12 coupled to a drive pulley 14 via an electrically activated clutch 16. The pulley 14 is coupled to a rotary shaft of the vehicle engine (not shown) via drive belt 18, and the clutch 16 is selectively engaged or disengaged to turn the compressor 12 on or off, respectively. The compressor capacity control is effectuated by an electrically activated capacity control valve 17 mounted in the rear head of compressor 12. In the illustrated embodiment, the compressor 12 has an internal bleed passage coupling its crankcase to the suction port 30, and the capacity control valve 17 selectively opens and closes a passage between the crankcase and the discharge port 28 to control the crankcase pressure, and therefore, the compressor pumping capacity. As described below in reference to FIGS. 2 and 3A–3B, the capacity control valve 17 additionally includes integral suction and discharge pressure sensors and control circuitry coupled to the pressure sensors. As described below in reference to FIGS. 4–5, such control circuitry carries out a control algorithm based on the measured pressures and the outside air temperature for electrically activating the clutch 16 and the control valve itself.

In addition to the compressor 12, the system 10 includes a condenser 20, an orifice tube 22, an evaporator 24, and an accumulator/dehydrator 26 arranged in order between the compressor discharge port 28 and suction port 30. A cooling fan 32, operated by an electric drive motor 34, is controlled to provide supplemental air flow through the condenser 20 for removing heat from condenser 20. The orifice tube 22 allows the cooled high pressure refrigerant in line 38 to expand in an isenthalpic process before passing through the evaporator 24. The accumulator/dehydrator 26 separates low pressure gaseous and liquid refrigerant, directs a gaseous portion to the compressor suction port 30, and acts as a reservoir for the reserve refrigerant charge. In an alternative system configuration, the orifice tube 22 is replaced with a thermostatic expansion valve (TXV); in this case, the accumulator/dehydrator 26 is omitted, and a receiver/drier (R/D) is inserted in line 38 upstream of the TXV to ensure that sub-cooled liquid refrigerant is supplied to the inlet of the TXV.

The evaporator 24 is formed as an array of finned refrigerant conducting tubes, and an air intake duct 40 disposed on one side of evaporator 24 houses an inlet air blower 42 driven by an electric blower motor 43 to force air past the evaporator tubes. The duct 40 is bifurcated upstream of the blower 42, and an inlet air control door 44 is adjustable as shown to control inlet air mixing; depending on the door position, outside air may enter blower 42 through duct leg 44a, and passenger compartment air may enter blower 42 through duct leg 44b.

An air outlet duct 52 disposed on the downstream side of blower 42 and evaporator 24 houses a heater core 54 formed as an array of finned tubes that conduct engine coolant. A temperature control door 56 pivoted at a point 84 near the heater core 54 is adjustable as shown to control what proportion of air exiting evaporator 24 must pass through the heater core 54. Air passing through heater core 54 is indicated by the arrow 58, while air by-passing the heater core 54 is indicated by the arrow 60. The heated and un-heated air portions are mixed in a plenum portion 62 of outlet duct 52 downstream of heater core 54 and temperature control door 56, and a pair of mode control doors 64, 66 are adjustable as shown to direct the mixed air through one or more outlets, including a defrost outlet 68, a panel outlet 70, and a heater outlet 72.

The blower motor 43 and the doors 44, 56, 64, 66 are controlled by an interface panel or control head 92 that includes a number of buttons, slide-levers and knobs that a manipulated by a vehicle occupant to indicate a desired operation of the air conditioning system 10. In the illustrated embodiment, the control head 92 includes a blower speed control knob 102, a mode control knob 104, a temperature slide-lever 106, an inlet air slide-lever 108, a normal air conditioning button 110, and an energy-efficient air conditioning button 112. Of course, the control head 92 may include additional driver interface switches (such as a switch for activating a rear window defogger), and the type of interface can vary considerably depending on styling requirements. For example, the inlet air slide lever 108 may be replaced with a button that simply switches between outside air and recirculated cabin air.

In the illustrated embodiment, temperature lever 106 is linearly positioned between cold (C) and hot (H) settings, and a temperature Bowden cable T is coupled to the temperature control door 56 to position the door 56 according to the position of lever 106. Similarly, the inlet air level 108 is linearly positioned between recirculation (R) and outside air (O) settings, and an inlet air Bowden cable I is coupled to the inlet air control door 44 to position the door 44 according to the position of lever 108. The blower speed control knob 102 is rotated to select a desired speed setting for blower 42; this produces a fan command F which dictates the speed of blower motor 43. The mode control knob 104 is rotated to select a desired mode, such as defrost, panel, bi-level, and so on; this produces a mode command M which dictates the position of air control doors 64 and 66, which may be positioned by electrical actuators (not shown). Of course, the inlet air control door 44 and/or the temperature control door 56 may be positioned by electrical actuators instead of Bowden cables, if desired. Finally, the normal and energy-efficient air conditioning buttons 110, 112 are momentarily depressed to alternately enable and disable air conditioning; an air conditioning status signal (AC) indicative of the occupant request is produced on line 114, and supplied as an input to a vehicle controller 116. The normal air conditioning button 110, which may be represented by the usual snowflake symbol as shown, is depressed to enable or disable normal air conditioning operation in which the capacity control valve 17 is activated to control the compressor capacity for maintaining the refrigerant suction pressure or the evaporator outlet air temperature at a predetermined value that provides maximum cooling without evaporator icing. The energy-efficient air conditioning button 112, which may be represented by an evergreen tree symbol as shown, is depressed to enable or disable energy-efficient air conditioning operation in which control setting indicators 118 and 120 on the control head 92 are illuminated to prompt the driver to request full-cold discharge air temperature and recirculated cabin air, and the circuitry in capacity control valve 17 initiates a compressor capacity control based on the refrigerant sensor information and a measure of the outside air temperature (OAT) provided by vehicle controller 116.

The vehicle controller 116 is preferably a microprocessor-based controller that is normally present in a vehicle, such as an engine or powertrain controller or a vehicle body controller, or even an air conditioning controller. As such, the vehicle controller 116 will typically have access to commonly used sensor data, such as the outside air temperature (OAT) and the engine speed (ES) as indicated in FIG. 1. In the illustrated embodiment, the vehicle controller 16 is also used to control activation of the condenser fan motor 34, and to receive air conditioning-related inputs such as the AC signal developed by control head 92 and an evaporator outlet air temperature (EOAT) signal developed by a temperature sensor 120 positioned on the evaporator 24 or in its outlet air stream. The received input signal data is supplied to the internal circuitry of capacity control valve 17 via the data bus 122, using any conventional communications protocol such as the Controller Area Network (CAN) serial interface. The same interface may be used to supply system-related information from the capacity control valve 17 to the vehicle controller 116, including the compressor speed (CS), the measured discharge pressure (DP), the compressor power consumption (COMP_PWR), and various diagnostic data. The discharge pressure DP may be used by the vehicle controller 116 to control activation of the condenser cooling fan motor 34, and the power consumption COMP_PWR may be used as an input for engine fuel and spark control algorithms, for example.

Figure 2:
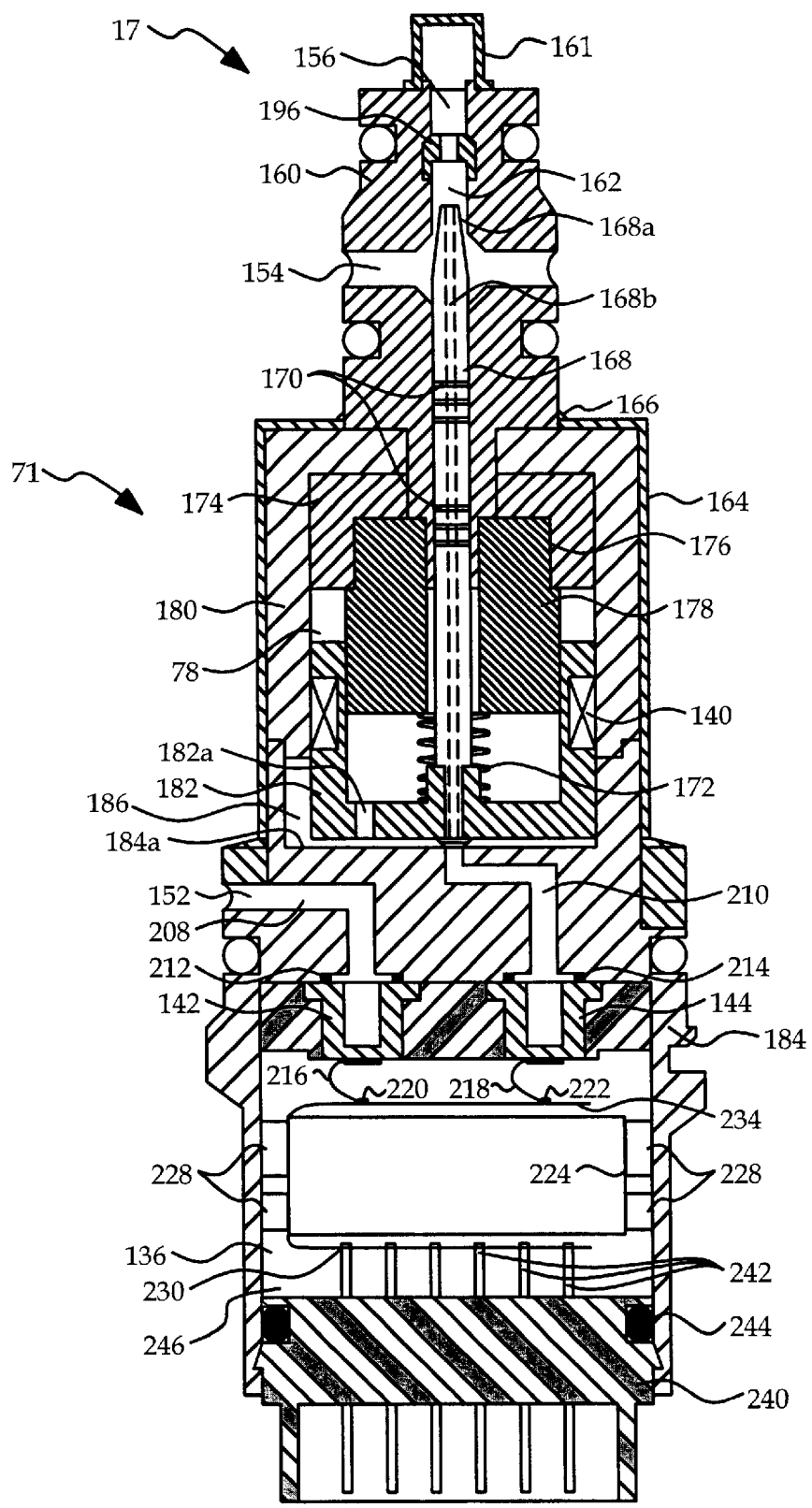
FIG. 2 is a cross-sectional view of the capacity control valve of FIG. 1.

As mentioned above, the capacity control valve 17 is electrically controlled to selectively open and close a passage between the compressor crankcase and the discharge port 28 to control the compressor pumping capacity, and includes integral suction and discharge pressure sensors 142, 144 and control circuitry coupled to the pressure sensors 142, 144. Referring to FIG. 2, the capacity control valve 17 includes three ports 152, 154 and 156 that are respectively placed in communication with chambers containing the compressor suction, crankcase and discharge pressures. The crankcase and discharge ports 154 and 156 are formed in a pressure port 160, with the discharge port 156 being defined by the inboard end of a central axial bore 162 passing through pressure port 160. A screen 161 prevents any foreign matter from entering the discharge port 156. The pressure port 160 is secured to a housing shell 164 by a weld 166, and a plunger 168 partially disposed within the bore 162 is axially positioned such that its inboard end either opens or closes a portion of bore 162 that couples the crankcase and discharge ports 154 and 156. The housing shell 164 encloses an electrically activated solenoid assembly 171 for positioning the plunger 168 within the bore 162, including a spring 172 for biasing the plunger 168 to a retracted position as shown in which the plunger 68 engages the housing piece 184 and refrigerant is permitted to flow from the discharge port 156 to the crankcase port 154. The solenoid assembly 171 includes a set of permanent magnets 174, 176 disposed between inner and outer pole pieces 178 and 180, and a cup-shaped spool 182 carrying a movable coil 140. The spool 182 is secured to an outboard portion of plunger 168, and the housing piece 184 defines a cavity 186 outboard of the spool 182. Activating the coil 140 produces a force that opposes the bias of spring 172 and moves the plunger 168 to an extended position (limited by the stop 196) in which its outboard end blocks the portion of bore 162 between discharge port 156 and crankcase port 154. A central axial bore 168b through plunger 168 couples the discharge port 156 to the cavity 186, and a passage 210 in housing piece 184 couples the cavity 186 to the interior of discharge pressure sensor 144 so that the pressure sensor 144 measures the compressor discharge pressure. The passage 208 couples the suction port 152 to the interior of pressure sensor 142 so that the pressure sensor 142 measures the compressor suction pressure. Significantly, the opening of passage 210 is directly aligned with the plunger bore 168b so that the discharge pressure sensor 144 is in direct communication with discharge port 156 regardless of the position of plunger 168.

Figure 3A:
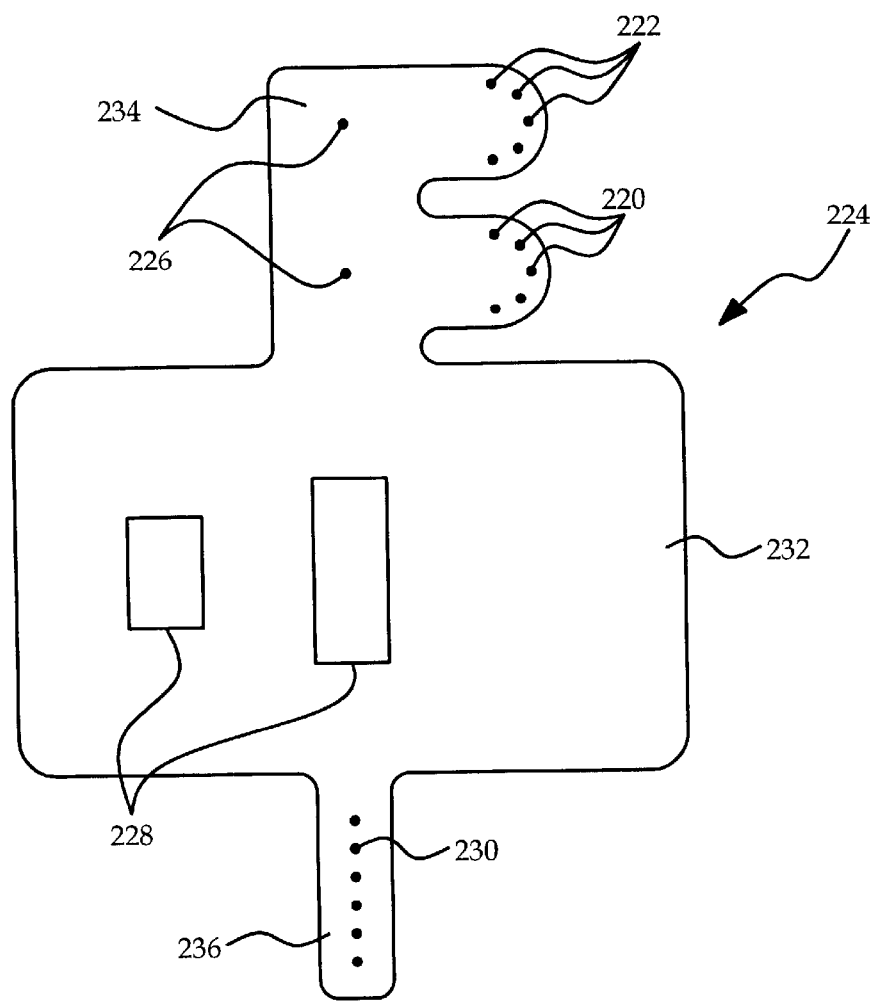
FIGS. 3A and 3B depict a flexible circuit for supporting the integral control circuitry of the capacity control valve of FIG. 1.
Figure 3B:
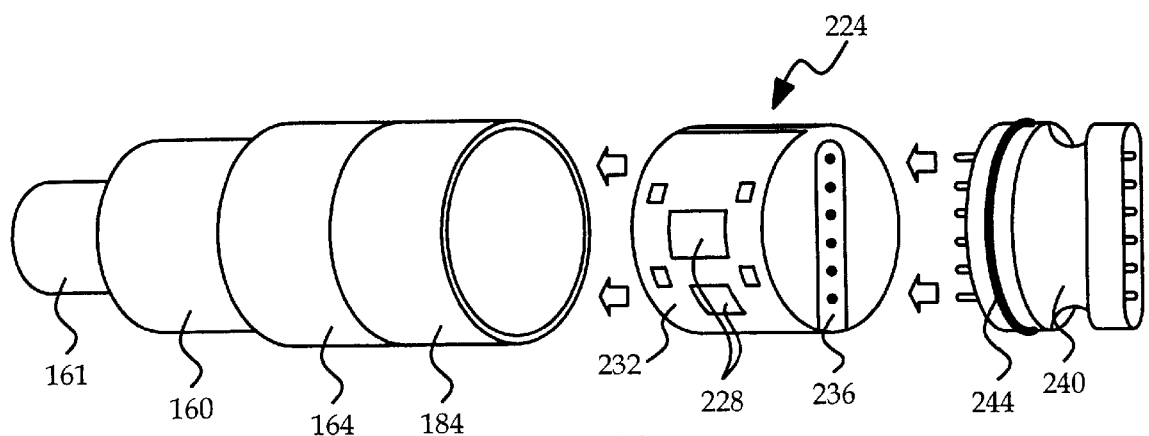

The pressure sensors 142, 144 are preferably conventional stainless steel pressure sensors, each having a diaphragm that is subject to flexure due to the pressure differential across it, although other types of pressure sensors could alternatively be used. The mechanical strain associated with the flexure is detected by a piezo-resistor circuit (not depicted) formed on the outboard surface of respective sensor diaphragm. Referring additionally to FIGS. 3A and 3B, the flexible conductors 216, 218 couple the respective piezo-resistor circuits to terminals 220, 222 formed on a flexible circuit 224. Another set of flexible conductors (not shown) couple the movable coil 140 to a different set of terminals 226 formed on the flexible circuit 224. A control circuit defined by a number of circuit elements 228 mounted on the flexible circuit 224 controls the activation of the movable coil 140 and a coil (not shown) of compressor clutch 16, and communicates with the vehicle controller 116 via the serial data bus 122 via a set of output terminals 230. As shown in FIGS. 3A–3B, the flexible circuit 224 has a body portion 232 that is rolled to fit within the outboard end of housing piece 184, and inboard and outboard terminal tabs 234, 236 that fold inward to facilitate electrical connections to the terminals 220, 222, 226 and 230. As indicated in FIG. 3B, the flexible circuit 224 is rolled such that the circuit elements 228 lie on its outer periphery; this enables heat producing circuit elements (such as a microcontroller, for example) to be maintained in contact with the inner periphery of housing piece 184 by a thermal adhesive (as seen in FIG. 2) so that the housing piece 184 acts as a heat sink. Although not shown in FIG. 2, the enclosed volume of housing piece 184 in the vicinity of flexible circuit 224 may be filled with a non-conductive potting material for improved durability in harsh environments.

A connector 240 is secured to the outboard end of housing piece 184 by swaging for example, and includes a set of terminals 242 that are soldered to the terminals 230 of flexible circuit 224. An O-ring 244 compressed between the connector 240 and the housing piece 184 seals the enclosed area 246 from environmental contaminants, and also isolates the area 246 from barometric pressure. Accordingly, the pressures measured by the sensors 142 and 144 can be calibrated to indicate the absolute pressure of the refrigerant in the respective suction and discharge passages 208 and 210, as opposed to a gauge pressure that varies with ambient or barometric pressure.

As indicated above, the control circuitry residing within the capacity control valve 17 controls the activation of the compressor clutch 16 and the capacity control valve coil 140 when air conditioning is requested. The control of compressor clutch 16 may be conventional in nature; that is, the clutch 16 is activated or deactivated in accordance with the AC status output, and is deactivated in any event if the measured discharge pressure DP falls outside a normal range of values, if the engine speed ES is excessive, or if engine or vehicle conditions require that air conditioning be disabled. The control of the coil 140, however, is uniquely suited to the illustrated configuration where sensors integral with the capacity control valve 17 measure the refrigerant suction and discharge pressures. Such control additionally requires a measure of thermal loading such as the outside air temperature signal OAT, and a measure of the engine speed ES. In the illustrated embodiment, these measurements, along with the AC status signal and the EOAT signal are supplied to the control circuit by the vehicle controller 116 since a vehicle controller ordinarily has access to engine speed and outside air temperature anyway, and the expense of providing sensors to separately measure such parameters is thereby avoided. The control circuitry within capacity control valve 17 converts the engine speed ES to a corresponding compressor speed CS based on the known drive pulley ratio, as the compressor speed CS can be used to specify limitations on the discharge pressure and the compressor capacity. In a preferred embodiment, the control circuitry is also used to compute the compressor power consumption COMP_PWR based on the compressor speed CS and the measured suction and discharge pressures SP, DP; this parameter can be useful in engine control, and is supplied to the vehicle controller 116 by way of data bus 122. Additionally, the control circuitry can conveniently perform other related functions, such as detecting low refrigerant charge, and performing various other diagnostic tests.

Figure 4:
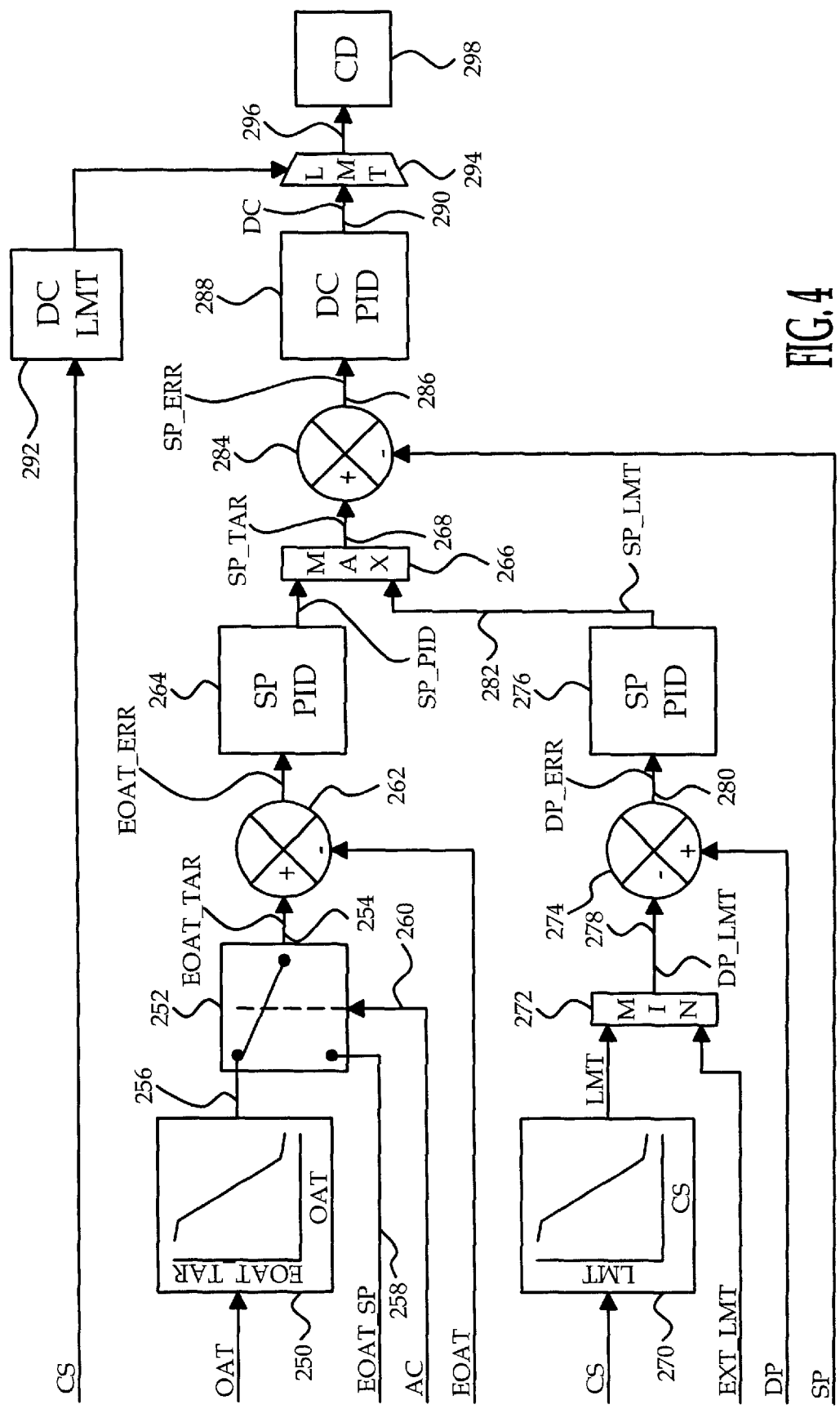
FIG. 4 is a block diagram of a control carried out by the control circuitry of FIG. 1 according to a first embodiment of this invention.
Figure 5:
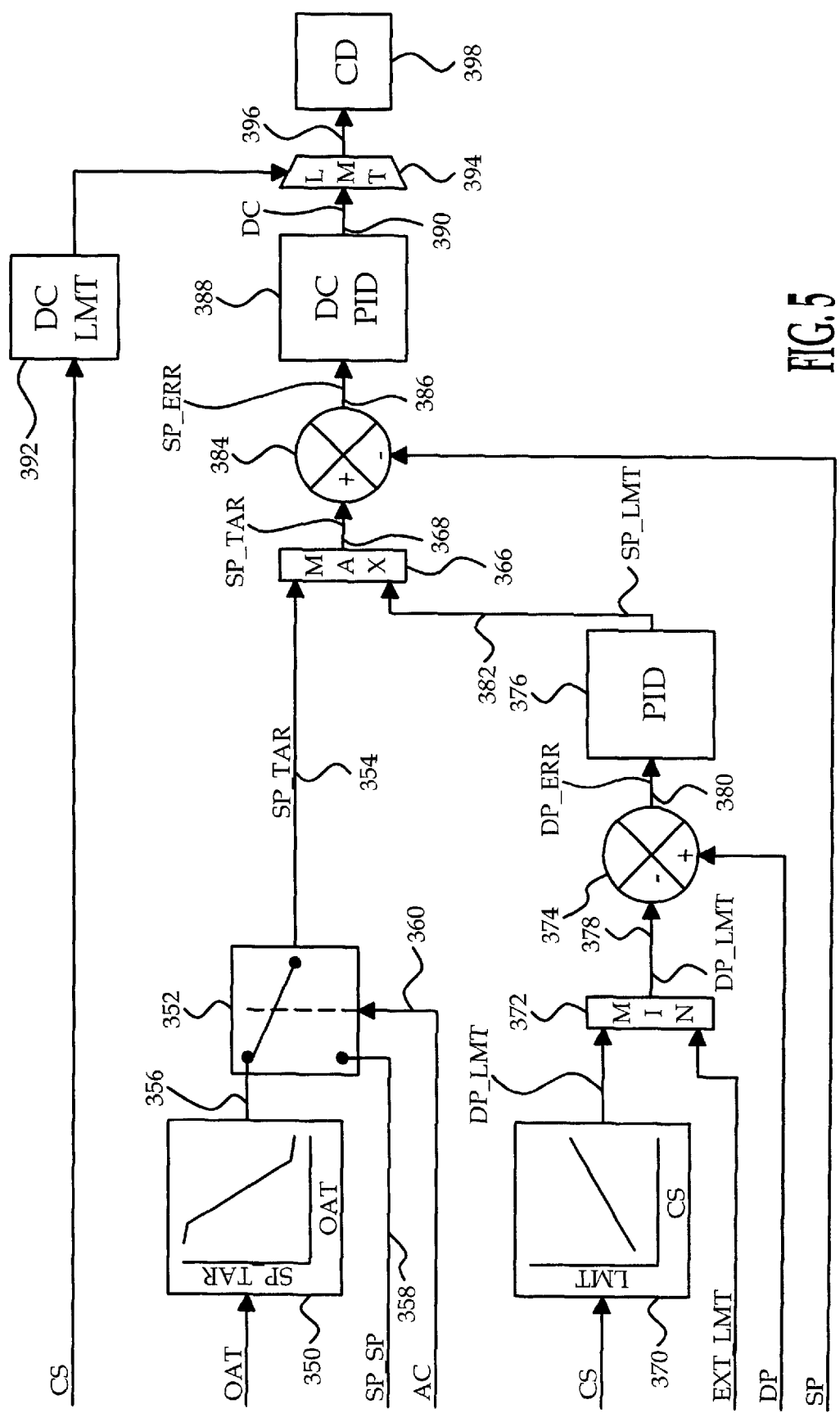
FIG. 5 is a block diagram of a control carried out by the control circuitry of FIG. 1 according to a second embodiment of this invention.

FIG. 4 depicts a compressor capacity control algorithm according to a preferred embodiment in which the system 10 includes an EOAT sensor 120 as depicted in FIG. 1. FIG. 5, on the other hand, depicts a control algorithm for systems that do not include the EOAT sensor 120. In general, both control algorithms select a suction pressure target SP_TAR and then adjust the activation level (duty cycle) of coil 140 as required to attain the target suction pressure. In the normal AC mode, SP_TAR is determined based on a predetermined set point and the sensed discharge pressure DP, whereas in the energy-efficient AC mode, SP_TAR is based on the outside air temperature OAT and the sensed discharge pressure DP. In each case, the sensed discharge pressure DP is used to limit SP_TAR.

Referring to FIG. 4, the table 250 and selector switch 252 develop an evaporator outlet air temperature target EOAT_TAR on line 254. The table 250 provides a value of EOAT_TAR for the energy-efficient mode on line 256, whereas the evaporator outlet air temperature set point EOAT_SP for normal AC operation is provided on line 258. When the AC input on line 260 indicates that the energy-efficient mode is in effect, the selector switch 252 supplies the output of table 250 to line 254; when the AC input indicates that the normal AC mode is in effect, the selector switch supplies EOAT_SP to line 254. The summing junction 262 forms a difference between the selected EOAT_TAR value and the measured EOAT value to form the temperature error EOAT_ERR. The temperature error EOAT_ERR is supplied as an input to PID (proportional-plus-integral-plus-differential) block 264, which forms a suction pressure control signal SP_PID for reducing EOAT_ERR. For example, if EOAT_ERR indicates that EOAT is higher than EOAT_TAR, SP_PID will tend to reduce in value, which requests the system 10 to produce a lower suction pressure for increased cooling of the conditioned air.

Since the suction pressure control signal SP_PID produced by PID block 264 may become too low from a systems perspective when EOAT_ERR is large, the block 266 sets the suction pressure target SP_TAR on line 268 to the greater (MAX) of SP_PID and a limit value SP_LMT determined by the blocks 270–276. The limit value SP_LMT serves to limit the compressor discharge pressure, and is determined based on the compressor speed CS, the measured discharge pressure DP, and optionally an externally supplied discharge pressure limit value EXT_LMT. The block 270 is a table of discharge pressure limit values LMT as a function of compressor speed CS, and the block 272 sets the discharge pressure limit DP_LMT on line 278 equal to the lesser (MIN) of LMT and EXT_LMT. The external limit EXT_LMT may be developed, for example, by a powertrain or engine controller for purposes of limiting the engine load imposed by system 10 during vehicle acceleration. The block 274 forms a difference between DP_LMT and the measured discharge pressure DP to form a discharge pressure error term DP_ERR on line 280. The discharge pressure error DP_ERR is supplied as an input to PID block 276, which forms a corresponding suction pressure control signal SP_LMT on line 282 for reducing DP_ERR whenever DP exceeds DP_LMT. Specifically, if DP exceeds DP_LMT, the output of PID block 276 will tend to increase and dominate suction pressure target SP_TAR on line 268, which will tend to drive the compressor discharge pressure downward.

The summing junction 284 forms a difference between the suction pressure target value SP_TAR and the measured suction pressure SP to form the suction pressure error SP_ERR on line 286. The suction pressure error SP_ERR is supplied as an input to PID block 288, which forms a PWM duty cycle control signal DC on line 290 for reducing SP_ERR. For example, if SP_ERR indicates that SP is higher than SP_TAR, DC will tend to increase in value to increase the compressor pumping capacity. However, the output of PID block 288 is subject to limitation based on the compressor speed CS, as indicated by blocks 292 and 294, with the limited duty cycle command on line 296 being supplied to a coil driver (CD) 298 for the capacity control valve coil 140.

Referring to FIG. 5, the table 350 and selector switch 352 develop an suction pressure target SP_TAR on line 354. The table 350 provides a value of SP_TAR for the energy-efficient mode on line 356, whereas the suction pressure set point SP_SP for normal AC operation is provided on line 358. When the AC input on line 360 indicates that the energy-efficient mode is in effect, the selector switch 352 supplies the output of table 350 to line 354; when the AC input indicates that the normal AC mode is in effect, the selector switch 352 supplies the set point SP_SP to line 354.

Since the target suction pressure SP_TAR on line 354 may become too low from a systems perspective when the outside air temperature (OAT) is high, the block 366 sets the suction pressure target SP_TAR on line 368 to the greater (MAX) of the value on line 354 and a limit value SP_LMT on line 382 determined by the blocks 370–376. The limit value SP_LMT serves to limit the compressor discharge pressure, and is determined based on the compressor speed CS, the measured discharge pressure DP, and optionally an externally supplied discharge pressure limit value EXT_LMT. The block 370 is a table of discharge pressure limit values LMT as a function of compressor speed CS, and the block 372 sets the discharge pressure limit DP_LMT on line 378 equal to the lesser (MIN) of LMT and EXT_LMT. As indicated above, the external limit EXT_LMT may be developed, for example, by a powertrain or engine controller for purposes of limiting the engine load imposed by system 10 during vehicle acceleration. The block 374 forms a difference between DP_LMT and the measured discharge pressure DP to form a discharge pressure error term DP_ERR on line 380. The discharge pressure error DP_ERR is supplied as an input to PID block 376, which forms a corresponding suction pressure control signal SP_LMT on line 382 for reducing DP_ERR whenever DP exceeds DP_LMT. Specifically, if DP exceeds DP_LMT, the output of PID block 376 will tend to increase and dominate suction pressure target SP_TAR on line 368, which will tend to drive the compressor discharge pressure downward.

The summing junction 384 forms a difference between the suction pressure target value SP_TAR and the measured suction pressure SP to form the suction pressure error SP_ERR on line 386. The suction pressure error SP_ERR is supplied as an input to PID block 388, which forms a PWM duty cycle control signal DC on line 390 for reducing SP_ERR. For example, if SP_ERR indicates that SP is higher than SP_TAR, DC will tend to increase in value to increase the compressor pumping capacity. However, the output of PID block 388 is subject to limitation based on the compressor speed CS, as indicated by blocks 392 and 394, with the limited duty cycle command on line 396 being supplied to a coil driver (CD) 398 for the capacity control valve coil 140.

In summary, this invention provides a low-cost vehicle air conditioning system that is selectively operated in an energy-efficient mode for reduced power consumption. The system is configured with a manual control head, and the compressor capacity is electrically controlled with capacity control valve having integral refrigerant sensors and control circuitry. Control setting indicators on the manual control head prompt the driver to request full-cold discharge air temperature and recirculated cabin air when the energy-efficient control mode is selected, and the control circuitry initiates a compressor capacity control based on the refrigerant sensor information and a measure of the outside air temperature to produce a suitable discharge air temperature at a reduced power consumption level.

While the present invention has been described in reference to the illustrated embodiments, it will be recognized that various modifications in addition to those mentioned above will occur to those skilled in the art. For example, either or both of the pressure sensors 142, 144 may be replaced with temperature sensors since the relationship between pressure and temperature of refrigerant in a closed volume system is known. Additionally, the control setting indicators may be continuously illuminated, if desired, the outside air temperature signal OAT may be replaced with a different indication of ambient thermal load, the compressor 10 may be driven by an electric motor instead of a vehicle engine, and so on. Accordingly, air conditioning systems incorporating such modifications may fall within the intended scope of this invention, which is defined by the appended claims.

What is claimed is:

1. A vehicle air conditioning system including a refrigerant compressor having a controllable pumping capacity, and further comprising:

an interface panel having temperature and inlet air selectors that are manipulated by an occupant to control an air discharge temperature and an air inlet source, and normal and energy-efficient air conditioning selectors that are manipulated by the occupant to select a normal air conditioning mode or an energy-efficient air conditioning mode;

control setting indicators for prompting the occupant to manipulate the temperature selector to a full-cold setting and the air inlet selector to a cabin air recirculation setting when the energy-efficient air conditioning mode is selected; and a capacity control valve disposed within said compressor, including an electrically activated mechanism for controlling the compressor capacity, sensors for detecting refrigerant suction and discharge pressures within said compressor, and control circuitry coupled to said sensors and said electrically activated mechanism for controlling the pumping capacity of said compressor based on the selected air conditioning mode, the detected refrigerant pressures, and a measure of ambient thermal load.

2. The vehicle air conditioning system of claim 1, wherein the control circuitry controls the pumping capacity of the compressor based on a target value of a system parameter, and includes selector means for setting the target value to a predetermined set point value when the normal air conditioning mode is selected, and for setting the target value to a value based on the measure of ambient thermal load when the energy-efficient air conditioning mode is selected.

3. The vehicle air conditioning system of claim 2, wherein said system parameter is the suction pressure of said compressor.

4. The vehicle air conditioning system of claim 3, wherein the control circuitry uses the detected discharge pressure to limit said target value, and activates said electrically activated mechanism based on a deviation of the detected suction pressure from the limited target value.

5. The vehicle air conditioning system of claim 2, wherein the system includes an evaporator, and said system parameter is an outlet air temperature of said evaporator.

6. The vehicle air conditioning system of claim 5, wherein the control circuitry develops a target suction pressure based on a deviation of the outlet air temperature of said evaporator from said target value, limits such target suction pressure based on the detected discharge pressure, and activates said electrically activated mechanism based on a deviation of the detected suction pressure from the limited target suction pressure.

7. The vehicle air conditioning system of claim 1, wherein an AC status signal indicating a selected air conditioning mode is supplied from the interface panel to a vehicle controller, and the vehicle controller communicates the AC status signal and the ambient thermal load to the control circuitry of said capacity control valve.

8. The vehicle air conditioning system of claim 7, wherein the system includes an electrically activated clutch for coupling said compressor to a vehicle engine, and the control circuitry of said capacity control valve activates and deactivates said clutch based on said AC status signal and the detected discharge pressure of said compressor.

9. The vehicle air conditioning system of claim 1, wherein the compressor is driven by a vehicle engine, the system includes means for obtaining a speed of said engine, and said control circuitry computes a power consumption of said compressor based on said speed and the detected suction and discharge pressures.

10. The vehicle air conditioning system of claim 1, wherein the control circuitry comprises circuit elements mounted on a flexible circuit that is disposed within a housing of said capacity control valve.

11. The vehicle air conditioning system of claim 10,wherein the flexible circuit is rolled into a generally cylindrical shape, with said circuit elements disposed on an exterior periphery of said flexible circuit, and at least one of said circuit elements is secured to an interior periphery of said housing to dissipate heat generated by such circuit element.

* * * * *